United States Patent [19]

Solomon

[11] 4,379,077
[45] Apr. 5, 1983

[54] ACTIVE CARBON CONDITIONING PROCESS

[75] Inventor: Frank Solomon, Great Neck, N.Y.

[73] Assignee: Diamond Shamrock Corporation, Dallas, Tex.

[21] Appl. No.: 202,580

[22] Filed: Oct. 31, 1980

[51] Int. Cl.$^3$ .................. B01J 21/18; H01M 4/88
[52] U.S. Cl. .................. 252/444; 252/425.3; 252/447
[58] Field of Search .............. 252/444, 447, 425.3

[56] References Cited

U.S. PATENT DOCUMENTS

| 2,749,359 | 6/1956 | Calkins et al. | 252/444 X |
| 3,439,025 | 4/1969 | Gallay et al. | 252/444 X |
| 3,778,387 | 12/1973 | Urbanic et al. | 252/444 X |
| 3,974,227 | 8/1976 | Berthoux et al. | 252/444 X |
| 4,066,699 | 1/1978 | Suggitt et al. | 252/447 X |
| 4,078,119 | 3/1978 | Murray | 429/13 |

OTHER PUBLICATIONS

Cotton, F. Albert, et al., *Advanced Inorganic Chemistry*, pp. 54–55, Third Edition, Interscience Publishers.

Primary Examiner—Donald R. Valentine
Attorney, Agent, or Firm—Woodrow W. Ban

[57] ABSTRACT

An improved process for making an oxygen cathode having a carbon supported hydroxide forming catalyst, wherein, prior to placement of catalyst on the carbon, active carbon particles are contacted with an alkali and then contacted with an acid. The alkali contacting step is conducted at temperatures ranging from 90°–140° C. for a time period of at least 0.5 hours.

7 Claims, No Drawings

ACTIVE CARBON CONDITIONING PROCESS

BACKGROUND OF THE INVENTION

Active carbon is contemplated herein for use both in its unmodified form and as catalyzed or activated with various procedures for deposition of catalytic materials therein or thereon, e.g., noble metals such as silver, platinum, palladium, spinels, e.g., mixed metal oxides of nickel and cobalt, such as $NiCO_2O_4$; perovskites, e.g., $CaTiO_3$, etc. as described at pages 54-44 et seq. of *ADVANCED INORGANIC CHEMISTRY* by F. Albert Cotton and Geoffrey Wilkinson, Third Edition, INTERSCIENCE PUBLISHERS.

The longevity in actual use of the enhanced active carbon particles in the corrosive environment of a chlor-alkali cell has left much to be desired. Depending upon the particular type(s) of carbon used, and frequently the impurities and content thereof, the length of actual service use in a chlor-alkali cell has been irregular and difficult to reproduce.

In accordance with this invention, it has been learned that by separately contacting the active carbon particles with an alkali (at elevated temperatures) and an acid the porosity of the active carbon is increased and accompanied by greater stability of the active carbon-containing catalyst layer(s) when the active carbon is formulated with other components and prepared either in rolled sheet form or in the form of a sintered flat electrode and incorporated into an electrochemical cell for production of chlorine and caustic.

FIELD OF THE INVENTION

A well known and important type of electrochemical cell is a chlor-alkali cell which basically produces chlorine gas and alkali, e.g., sodium hydroxide, by electrolytically dissociating concentrated brine solution, viz, a solution of sodium chloride in water.

Such cells are divided by a separator into anode and cathode compartments. The separator characteristically can be a substantially hydraulically impermeable membrane, e.g., a hydraulically impermeable cation exchange membrane such as the commercially available NAFION manufactured by the E. I. duPont de Nemours and Co. Alternatively, the separator can be a porous diaphragm, e.g., asbestos which can be in the form of vacuum deposited fibers or asbestos paper sheet as are well known in the art. The anode can be a valve metal, e.g., titanium, provided with a noble metal coating to yield what is known in the art as a diametrically stable anode. While varying materials can be employed for the anode and cathode of such cells, this invention pertains to active carbon which is primarily utilized in formulating active layers for making cathodes for chlor-alkali cells.

Fairly recently there have been proposed improvements in energy conservation in the operation of such electrolytic chlor-alkali cells by using so-called oxygen (air) cathodes. The purpose of such a cathode is to reduce the electrical power requirement necessary to conduct the dissociation referred to herein above. It has been found that as much as approximately 25 percent of the power requirement of a chlor-alkali cell is assignable to the unwanted production of hydrogen at the cathode during the electrolysis. By use of an oxygen (air) cathode, the production of molecular hydrogen can be avoided too and instead the oxygen reduced to form hydroxide ions. Thus, 25% of the electrical power required to operate chlor-alkali cells could theoretically be conserved by avoiding the production of hydrogen by use of oxygen (air) cathodes.

PRIOR ART

Although there have been many efforts aimed at obtaining stable air cathodes for utilization in chlor-alkali cells, little information is apparently known about obtaining cathode stability by treating the active carbon, per se.

U.S. Pat. No. 4,078,119 to Murray Katz et al refers to a cathode of electrically conductive particles having a catalyst deposited on the surface. These particles are disclosed to be agglomerates of smaller porous particles having catalyst on the surface. Such particles are disclosed to be bonded together by hydrophobic corrosion-resistant microspheres, e.g., of polytetrafluoroethylene. The conducting particles are disclosed as being made of such suitable materials as carbon black, e.g., Cabot "Vulcan XC 72," or graphitized carbon black. Of course, these materials are not active carbons. Katz et al disclose prewetting of the electrode containing the agglomerates of conductive particles after they have been formed into the electrode layer, viz, agglomerated and incorporated with the binder of polytetrafluoroethylene microspheres. According to the Katz et al patent, the electrode is prewetted with the electrolyte and then a soluble catalyst-containing material caused to enter into solution with the electrolyte on the surfaces of the conducting particles which have been wet by the electrolyte. A chemical reaction is then caused to occur which deposits the catalyst on the surface of these particles. When the conducting particles of Katz et al are made of graphitized carbon black, Katz et al state that it is necessary to prewet the conductive carbon particles in the electrode by means of an anodic potential applied to the electrode which renders the surface of the graphitized particles wettable with electrolyte probably by the formation of oxides of carbon on the surface at the interface between the electrolyte and the carbon.

The concept of prewetting of active carbon particles already incorporated into an electrode layer wherein they are bonded as agglomerates by a polytetrafluoroethylene particles is not the conditioning (pretreating) process of this invention which involves sequential exposure of active carbon particles to contact with a base (alkali) and an acid, the alkali contact being at elevated temperatures.

BRIEF SUMMARY OF THE INVENTION

This invention is directed to preparing active carbon particles for electrodes, e.g., oxygen (air) cathodes, wherein said active carbon particles have a B.E.T. surface area of at least 1000 $m^2/g$ combined with an ash content of less than about 4 percent. Procedurally this is accomplished by treating active carbon particles by separately contacting them with an alkali at elevated temperatures and with an acid. Such oxygen (air) cathodes can be used in chlor-alkali cells.

DESCRIPTION OF THE INVENTION

The active layer of an oxygen (air) cathode is one containing the active carbon particles where hydroxide is formed. Such particles can be provided with precious metal, e.g., silver, platinum, etc. deposited on and/or in the pores thereof to serve as catalyst or actuators to enhance the formation of hydroxide. Moreover, such catalyzed active carbons can be present within an unsintered matrix (network) of carbon black-polytetrafluoroethylene (PTFE) which is fibrillated (compressed and greatly attenuated) to yield a matrix active layer in accordance with U.S. patent application Ser. No. 202,578, now U.S. Pat. No. 4,354,958, entitled "Matrix Active Layer for Electrodes" and filed in the name of Frank Solomon of even date herewith. During testing of such active layers, it was noticed that after certain use periods in the corrosive alkaline environment of a chlor-alkali cell, portions of the active layer containing the catalyzed active carbon would slough off (partially disintegrate or fall apart) from the remaining portions of this layer. This sloughing would necessitate shutdown of the cell and removal of cathode.

While the exact reason(s) for this sloughing are not entirely known, it has been discovered that the durability of the layer containing the catalyzed active carbon particles in association with the PTFE can be substantially increased and its useful life lengthened by a process of separately contacting said active carbon (before catalyzing same) with an alkali at elevated temperatures and with an acid. Usually the alkali-treated particles are dried and subsequently contacting with an acid at ambient temperatures, all prior to deposition of the precious metal catalyst (if one is employed) and mixing (incorporation) with PTFE to form the self-sustaining sheet, viz., active layer, of the oxygen cathode. An additional benefit to the aforementioned pretreatment conditioning process is that there is observed an increase in the internal porosity of the active carbon.

The active carbon whose use is contemplated in accordance with this invention encompasses a variety of materials which in general, prior to the sequential pretreatment of this invention, encompass a variety of amorphous carbonaceous materials, generally of vegetable origin which contain inorganic residue, e.g., non-carbonaceous oxides collectively designed as ash.

In accordance with a preferred embodiment of this invention, the active carbon starting material is "RB" carbon which is a form of active carbon manufactured by Calgon, a division of Merck, and is made from bituminous coal by known procedures. This material can contain as much as approximately 23% of various oxides and components which can be collectively classified as ash. Typical analysis of the ash contained in RB carbon is as follows:

| Component | Weight Concentration |
|---|---|
| Silica | 43.34 |
| Alumina ($Al_2O_3$) | 29.11 |
| Iron Oxides ($Fe_2O_3$) | 20.73 |
| Others | 6.82 |

The sequential pretreatment process of this invention does not totally remove the ash content from the active carbon; but results in a substantial reduction thereof, viz., from about 70-80% or more of the ash is removed by the process of this invention.

The initial stage of treatment constitutes contacting the active particles as obtained, e.g., RB carbon as mentioned above, with either an acid or an alkali followed by contact with the other. For example, during the base contacting stage, the alkali material, such as sodium hydroxide, potassium hydroxide, etc., is maintained at elevated temperatures ranging from about 90° to about 140° C. and several contacting steps are used over time periods of e.g., 0.5 to 24 hours, followed by one or more intermittent water washing step(s).

Then, the thus treated active carbon is contacted with an acid, such as hydrochloric acid, for similar extended time periods at ambient temperatures. Between the alkali and acid contacting phases the active carbon particles can optionally be dried. However, drying is not required in accordance with this invention.

Usually, the alkali is employed in the form of an aqueous solution containing from 28 to 55, and more usually from 35 to 45 wt. % alkali based on total solution.

The acid content of the aqueous acid solution customarily ranges from 10 to 30 % wt. % and more usually from 15 to 25 wt. % acid based on total solution.

Prior to contact with the alkali solution, it has been found desirable to first comminute, e.g., ball mill or otherwise divide up the active carbon particles as purchased. For example, RB active carbon was ball milled for 2-6 hours, and more usually approximately 4 hours to reduce its particle size to the range of from about 5 microns to about 30 microns.

Usually the alkali washing stage is performed in several individual washing steps using a hot (100° to 130° C.) alkali solution. After the alkali washing has been completed, the alkali is neutralized using one or more water washing step(s) to remove the alkali prior to the acid wash stage.

Similarly the acid washing stage can be accomplished in several discrete washing steps rather than all at one time. Additionally, the contact with acid can be accomplished at lower temperatures for longer periods of time. For example, the acid wash can be conducted overnight (approximately 16 hours) at room temperature. As with the alkali contact stage preferably after the acid contact the active carbon particles are subjected to a water washing to remove the acid, followed by drying. Alternatively, the acid stage can be conducted at elevated temperatures using a Soxhlet extraction constant reflux apparatus, e.g., using HCl, HBr, etc. at 110° C. for about 0.5 hr., viz. constant boiling mineral acids, each having its respective boiling range. While many acids may suitably be employed, the acid of choice is hydrochloric acid.

The seqential conditioning or pretreatment of this invention results in substantial reduction of the aforementioned ash content of the active carbon particles. Typically, when utilizing active carbon having an initial B.E.T. surface area of 600 to 1500 $m^2/g$ (square meters per gram) of carbon and pretreating it with alkali and acid in accordance with this invention; reductions of ash content from about 12 wt.% to not more than about 4 wt.% have been accomplished. The term "B.E.T." surface area refers to the well known method of determining surface area according to nitrogen absorption developed by Brunauer, Emmett and Teller.

Characteristically RB active carbon which has been subjected to the sequential deashing process of this invention and incorporated with carbon black and PTFE in accordance with Docket 3112, have lasted for over 8,000 hours at 300 milliamps of current/$cm^2$ of electrode surface.

The invention will be illustrated additionally in the following examples in which percents, ratios and parts are by weight unless otherwise indicated.

EXAMPLE 1

(ALKALI THEN ACID)

This deashing procedure involved ball milling 100 grams of commercially available RB active carbon (10 to 20 microns) at a time in an Abbe ball mill. After accumulating 400 grams of ball milled active carbon it was treated with 38% NaOH, preheated to 110°–120° C. in an oil bath maintained at 160°–170° C. in order to maintain the temperature of the caustic bath. The suspension of carbon and caustic was stirred for one hour and then the expended caustic was filtered off. This procedure was repeated three times using approximately 1600 cc of sodium hydroxide in each deashing bath. After this alkali contact, the RB carbon was water washed until its pH was down to about 10, viz., the pH of the wash water was down to about 10. The active carbon was then slurried in 1600 cc of 20% hydrochloric acid, and allowed to stand overnight. The active carbon was finally washed until relatively acid-free, pH of the wash water being approximately 3.5 and then dried at 110° C. overnight. Ash contents of about 2 and less than about 3% are thus obtained with B.E.T. surface areas of 1500 to 1800 $m^2/g$ (as compared with B.E.T. surface areas of 1150 to 1350 $m^2/g$ prior to treatment.

EXAMPLE 2

(ACID THEN ALKALI)

Alternatively a commercially available (Calgon) active carbon known as "PWA" was first acid washed as described above in Example 1 to an ash content of 4.6% and then treated in 38% KOH for 16 hours at 115° C. The resulting ash content was 1.6%

EXAMPLE 3

(ALKALI THEN ACID)

Ball milled "RB carbon" was found to have an ash content of approximately 12% as received. This "RB carbon" was treated in 38% KOH for 16 hours at 115° C. and found to contain 5.6% ash content after a subsequent furnace operation. The alkali-treated "RB carbon" was water washed and then treated (immersed) for 16 hours at room temperature in 1:1 aqueous hydrochloric acid (20% concentration). The resulting ash content has been reduced at 2.8% and this material has B.E.T. surface area of 1500 to 1800 $m^2/g$ as compared with initial B.E.T. surface area of 1150 to 1350 $m^2/g$ prior to treatment.

Measurements of the surface area of the active carbon conditioned in accordance with this invention, reveal that the conditioned active carbon has typical B.E.T. surface areas after treatment in the range of 1300 to 1800 and higher $m^2/g$ of active carbon, and more typically B.E.T. surface areas in excess of 1500 $m^2/g$ of active carbon and higher in combination with an ash content of less than about 4 percent, and more typically less than about 3 percent.

Overall, then, it is evident that the sequential alkali-acid washing pre-treatment or conditioning process of this invention offers a means of stabilizing and increasing the surface area of active carbon particles having ash contents within the ranges set forth above.

What is claimed is:

1. In a process for making an oxygen cathode having a carbon supported hydroxide forming catalyst the improvement comprising treating active carbon particles by contacting said active carbon particles with an alkali and thereafter contacting said active carbon particles with an acid, said contacting with alkali being conducted at temperatures ranging from about 90° to 140° C. for a time period of at least about 0.5 hours, said contacting steps occurring prior to placement of any catalyst on the carbon.

2. A process as in claim 1 wherein said acid contact is conducted using a constant boiling mineral acid at temperatures ranging from ambient to the boiling range of said acid for time periods of about 0.5 to 16 hours.

3. A process as in claim 1 wherein the respective separate alkali and acid contacts are conducted in a plurality of steps with water washing between each step.

4. A process as in claim 1 wherein said active carbon is comminuted to a particle size ranging from about 5 to about 30 microns before either alkali or acid contact.

5. A process as in claim 1 wherein said acid is hydrochloric acid.

6. A process as in claim 1 wherein said alkali is sodium hydroxide.

7. A process as in claim 1 wherein said alkali is potassium hydroxide.

* * * * *